United States Patent
Ganz et al.

(10) Patent No.: US 7,143,738 B2
(45) Date of Patent: Dec. 5, 2006

(54) DIRECT-INJECTION SPARK-IGNITION INTERNAL COMBUSTION ENGINE

(75) Inventors: Benedikt Ganz, Elchesheim-Illing (DE); Jean-Francois Gaudry, Stuttgart (DE); Hans Hartmann, Stuttgart (DE); Rolf Klenk, Stuttgart (DE); Andreas Mleinek, Stuttgart (DE); Klaus Röbler, Stuttgart (DE); Helmut Scheffel, Holzgerlingen (DE); Dirk Strubel, Stuttgart (DE); Matthias Zahn, Mannheim (DE)

(73) Assignee: DaimlerChrysler AG, Stuttgart (DE)

( * ) Notice: Subject to any disclaimer, the term of this patent is extended or adjusted under 35 U.S.C. 154(b) by 18 days.

(21) Appl. No.: 11/157,165

(22) Filed: Jun. 20, 2005

(65) Prior Publication Data

US 2005/0252483 A1    Nov. 17, 2005

Related U.S. Application Data

(63) Continuation-in-part of application No. PCT/EP03/12732, filed on Nov. 14, 2003.

(51) Int. Cl.
    *F02B 23/08* (2006.01)
(52) U.S. Cl. .................. 123/295; 123/298; 123/305
(58) Field of Classification Search ............. 123/295, 123/298, 305
    See application file for complete search history.

(56) References Cited

U.S. PATENT DOCUMENTS 2,269,084 A * 1/1942 McCarthy .............. 123/298
2,766,738 A * 10/1956 Hoffmann .............. 123/298
6,176,215 B1 * 1/2001 Baur et al. .............. 123/295
6,675,767 B1 * 1/2004 Gatellier et al. ......... 123/298
6,832,594 B1 * 12/2004 Hiraya et al. ........... 123/305
6,978,760 B1 * 12/2005 Stewart et al. .......... 123/305

FOREIGN PATENT DOCUMENTS

| DE | 198 04 463 | 8/1999 |
| DE | 199 22 964 | 11/2000 |
| JP | 63 253 112 | 10/1988 |
| JP | 10 141 135 | 5/1998 |
| JP | 11 082 028 | 3/1999 |

\* cited by examiner

*Primary Examiner*—Erick Solis
(74) *Attorney, Agent, or Firm*—Klaus J. Bach

(57) ABSTRACT

In a direct-injection spark-ignition internal combustion engine having one injector per cylinder for injecting fuel into a combustion chamber, wherein the injector has an injection nozzle with a plurality of injection holes which are distributed over its circumference, so that the jets of fuel from the injection holes form during an injection process a conical cloud of fuel, the piston opposite the injection nozzle includes a piston recess provided with a plurality of radial cavities extending from the recess radially into the piston head for receiving fuel injected into the combustion chamber.

14 Claims, 2 Drawing Sheets

DIRECT-INJECTION SPARK-IGNITION INTERNAL COMBUSTION ENGINE

This is a Continuation-In-Part Application of International Application PCT/EP03/12732 filed 14 Nov. 2003 and claiming the priority of German application 102 61 185.3 filed 20 Dec. 2002.

BACKGROUND OF THE INVENTION

The invention relates to a direct injection spark ignition internal combustion engine with one injector per cylinder for injecting fuel into a combustion chamber delimited by a piston, the piston having a recess formed therein and the injector having injection ports distributed over the circumference for injecting fuel into the recess in the piston.

In direct-injection internal combustion engines, the fuel/air mixture which is to be combusted in order to drive the piston and which is composed of fuel injected directly into the combustion chamber to mix with combustion air which is supplied to the cylinders separately through inlet ducts, is formed in the combustion chamber of each cylinder. In the case of spark-ignition internal combustion engines the fuel/air mixture has to be ignited by the ignition spark of a spark plug which projects into the combustion chamber and an ignitable mixture therefore has to be made available at the electrodes of the spark plug. In a stratified charge operating mode of the engine, it is possible, by late injection of fuel during the working cycle of the respective cylinder, to form a stratified mixture cloud with an ignitable fuel concentration when the overall mixture in the entire volume of the combustion chamber is lean. The operation with a stratified mixture leads to a reduction in the fuel consumption and the emission of pollutants by the internal combustion engine. In order to ensure that the mixture can be ignited in the region of the spark plug, in particular in the stratified charge operating mode, the fuel is usually injected into the combustion chamber in a conical jet, forming a conical cloud of fuel and combustion air. In the case of what is referred to as a jet-controlled combustion method, the formation of the mixture depends greatly on the quality of the ignitable mixture of the cloud of fuel in the region of the spark plug. In order to ensure a stable formation of mixture and ignition of the mixture in the case of a jet-controlled combustion method by means of a satisfactorily configured, conical cloud of fuel, so-called multi-hole injectors are provided which have a plurality of injection holes distributed over the circumference of the injector.

DE 198 04 463 A1 discloses such a multi-hole injector in which at least one row of injection holes distributed over the circumference of the injection nozzle is provided in order to implement a jet-controlled combustion method by forming the cloud of mixture by selective injection of fuel via the injection holes.

The geometrical shape of the combustion chamber is influenced by a piston recess which is formed in the piston head of the piston. The piston recess is located here approximately opposite the injection nozzle and represents the residual volume of the combustion chamber, in which the injected fuel is located, in the region of the top dead center of the movement of the piston. DE 199 22 964 A1 discloses a geometric configuration of the piston recess for improving the mixture formation with fuel which is injected in a conical shape. In particular in the case of auto-ignition diesel internal combustion engines, the geometric shape of the combustion chamber has a decisive influence on the quality of the mixture formation. The known configuration of the combustion chamber has in this context what is referred to as an omega piston recess in which the fuel is directed by a central elevation on the bottom of the piston recess into the outer edge regions of the circular piston recess in order to improve the formation of the fuel/air mixture.

When multi-hole injectors are used for the internal formation of the mixture in direct-injection spark-ignition engines the fuel is injected as late as possible during the compression stroke of the piston in order to bring about the greatest possible degree of stratification of the mixture cloud. During operation of such internal combustion engines, it has been repeatedly detected that the emission of pollutants is undesirably high and the surface of the piston also tends to coke up. Such phenomena are due to wetting of the surface of the piston with the injected fuel, which wetting is unavoidable despite the internal pressure of the cylinder which is particularly high at the injection time because the distance between the injector and piston head surface is very short at that point.

It is the object of the present invention to provide an internal combustion engine wherein wetting of the piston with fuel during the injection is prevented even during operation with late injection of fuel.

SUMMARY OF THE INVENTION

In a direct-injection spark-ignition internal combustion engine having one injector per cylinder for injecting fuel into a combustion chamber, wherein the injector has an injection nozzle with a plurality of injection holes which are distributed over its circumference, so that the jets of fuel from the injection holes form during an injection process a conical cloud of fuel, the piston opposite the injection nozzle includes a piston recess provided with a plurality of radial cavities extending from the recess radially into the piston head for receiving fuel injected into the combustion chamber.

During the injection of fuel, the individual jets of fuel which emerge from the injector with radial components within the generally conical jet beam are received in the radial cavities and are kept away from the surface of the piston head. The configuration of the piston recess according to the invention with additional radial cavities prevents the surface of the piston from being wetted with fuel and thus reduces the emission of pollutants by the internal combustion engine. Formation of radial cavities in the piston head in order to receive the jets of fuel of the multihole injector provides for a selected configuration of the injection beam of fuel during the jet-controlled mixture formation and also permits relatively large angles of aperture of the conical jet. In this context, the fuel can, if necessary, be injected with an angle of aperture of the cone—formed from the fuel jets of all injection holes of the multi-hole injector—of approximately 130°. The aperture cone is preferably 75° to 85°.

The widening of the piston recess with radial cavities and the prevention of wetting of the surface of the piston with fuel which is achieved in this way permits very late injection times during the compression stroke. According to the invention, a stratified mixture with locally different fuel concentrations (stratified charge operating mode) is formed at least in the lower load range of the internal combustion engine by the late injection of the fuel, with the start of the injection of fuel being provided less than approximately 50° crank angle before the top dead center during the compression stroke. The ignition of the fuel/air mixture advantageously takes place not later than 10° crank angle after the end of the fuel injection by the multi-hole injector. The radial cavities receive the respective jets of fuel of the individual spray holes of the injector and increase the distance between the piston recess wall and the respective injection hole, thus permitting fuel to be injected with a high pressure of more than 80 bar. The fuel is preferably injected with more than 160 bar.

One radial cavity is preferably provided per injection hole of the injector, the jet of fuel of the respective injection hole being directed into said cavity and the injected fuel being mixed with the combustion air in the cylinder. In a preferred configuration of the invention, the radial cavities are distributed rotationally symmetrically along the circumference of the piston recess. A piston with a piston recess which is configured in such a way can interact with multi-hole injectors with various numbers of holes which are distributed uniformly over the circumference of the multi-hole nozzle, which number is an integral multiple of the number of rotationally symmetrical radial cavities. In one preferred configuration, the number of injection holes over the circumference of the injection nozzle matches the number of radial cavities for widening the piston recess, with each injection hole being assigned to a radial cavity. At the same time, an installation position of the injector which is determined in accordance with the rotational angle can also be provided, for example with a locally different fuel concentration in the taper envelope of the conical jet for the purpose of enrichment of fuel in the region of the spark plug. The radial cavities may be configured depending on the rotational angle orientation of the injector.

In a preferred configuration, the piston recess with the radial cavities in the piston is extended radially outwards beyond an edge of the piston recess lying at the level of the piston head, as a result of which the radial cavities continue partially underneath the top of the piston head in the manner of a cavern. The piston recess in this case advantageously formed with a central elevation from its bottom, which elevation may be configured in the shape of a cone in order to actively support the formation of mixture in the radial cavities. The radial cavities which lie diametrically opposite at the edge of the piston recess have an approximately omega-shaped cross section.

The invention will become more readily apparent from the following description of an exemplary embodiment with reference to the accompanying drawings.

DESCRIPTION OF A PREFERRED EMBODIMENT

Figure 1:
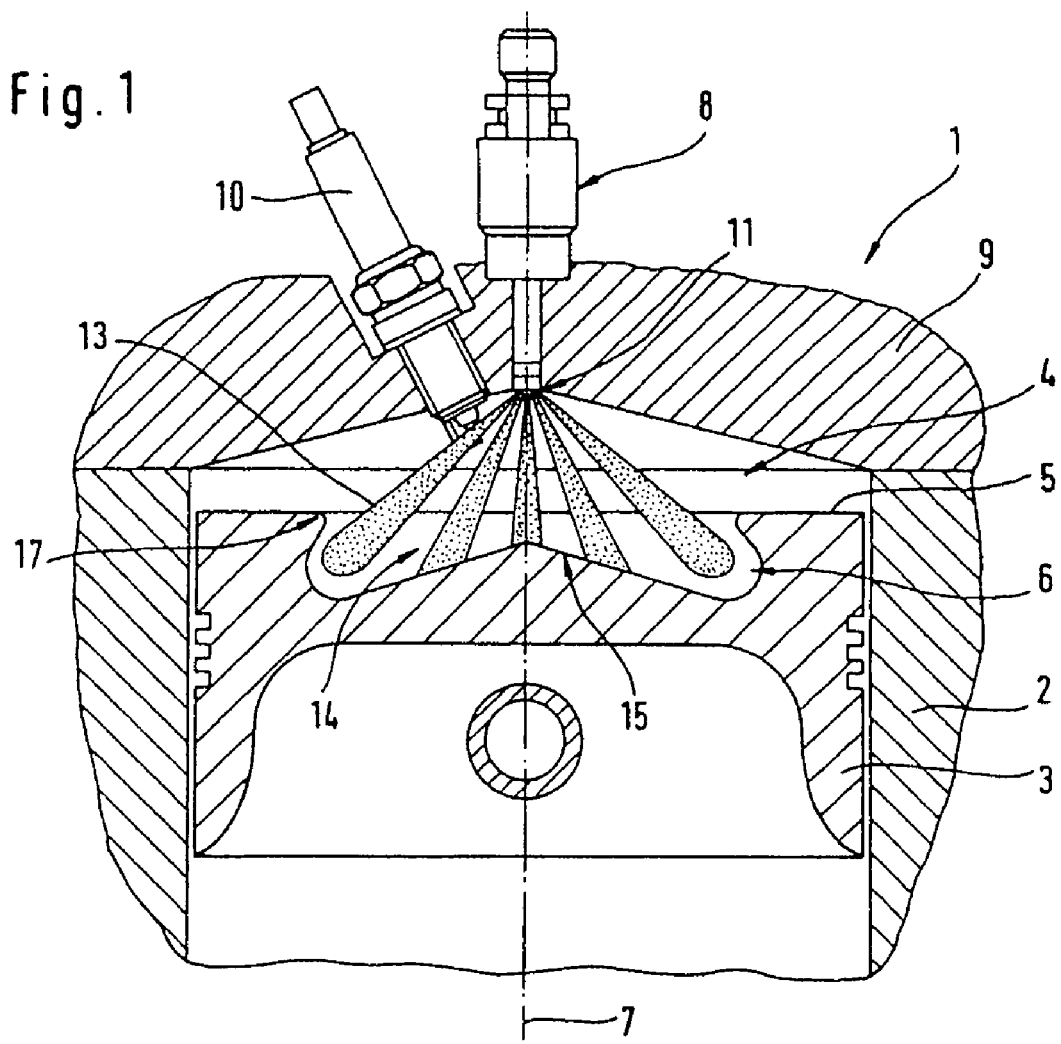
FIG. 1 shows a longitudinal section of a cylinder of a spark-ignition internal combustion engine.

The internal combustion engine 1 which is illustrated in section in FIG. 1 comprises a plurality of cylinders 2 in which, in a manner which is known per se, a reciprocating piston 3 is arranged which is longitudinally movable and bounds, with its piston head 5, a combustion chamber 4. The cylinder 2 is closed off by a cylinder head 9 in which an injector 8 for direct injection fuel into the combustion chamber 4 is received. In addition, at least one inlet valve through which fresh gas is fed into the combustion chamber in order to form ignitable fuel/air mixture with the fuel injected by the injector 8 during a charge exchange, is provided in the cylinder head 9. The fuel/air mixture is ignited by a spark plug 10. The injector 8 is arranged in a central position of the combustion chamber 4 on a cylinder axis 7 of the cylinder 2 and injects the fuel in the form of a cone into the combustion chamber with its injection nozzle projecting into the combustion chamber 4. A conical cloud 14 of mixture is formed with the combustion air, with the electrodes of the spark plug 10 being located in the envelope region of the conical cloud 14 of fuel. In the lower load ranges of the internal combustion engine a stratified charge operating mode is provided, with the fuel being injected at a later time just before the mixture is ignited. At the same time, local differences in the concentration of fuel are present in the combustion chamber and when there is an overall lean mixture a mixture which is rich in fuel and ignitable can be made available at the electrodes of the spark plug 10.

Figure 2:
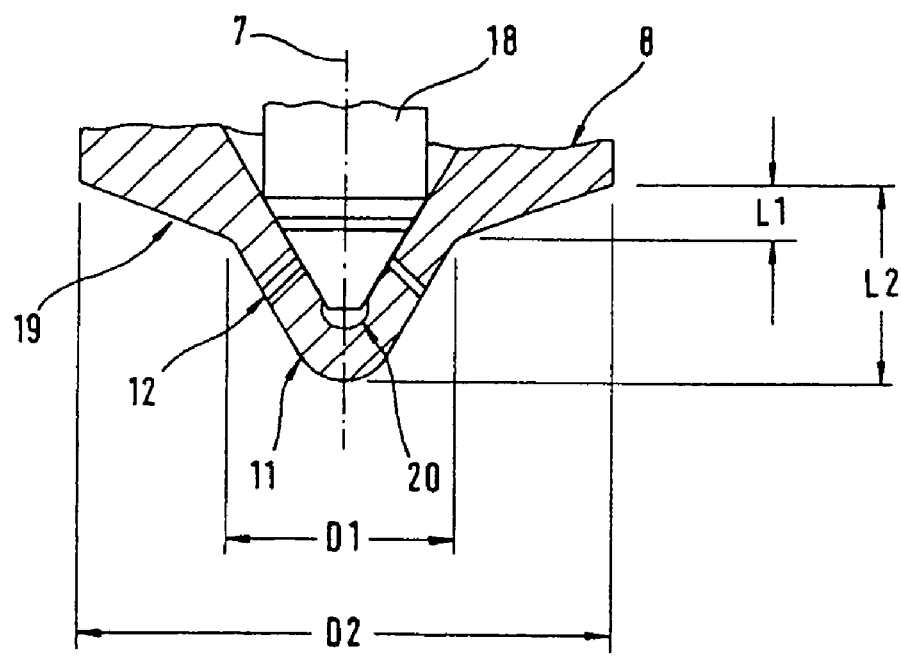
FIG. 2 is a sectional view of an injection nozzle.

In order to generate the jet of fuel, the injection nozzle 11 of the injector 8 is equipped with a plurality of injection holes over its circumference, through which holes individual jets of fuel enter the combustion chamber 4 during an injection process. The injection nozzle 11 is preferably configured as what is referred to as a perforated seat nozzle, as shown in FIG. 2. The injector 8 has here an inwardly opening valve needle 18. The valve element 18 closes off the fuel chamber, which is in communication with the exterior through the injection holes 12. Fuel under high pressure of preferably more than 160 bar is made available for injection in the fuel chamber 20. When the injector needle 18 lifts off in the direction of the longitudinal axis 7, the injection holes 12 which are distributed uniformly over the circumference of the perforated nozzle 11 are cleared. The injection holes 12 are embodied as ducts in the wall of the injection nozzle 11 in such a way that each jet of fuel of an injection hole is emitted at an angle to the longitudinal access 7. The individual jets of fuel form the envelope of a conical jet.

FIG. 2 shows an injector 8 at whose injector tip 19 an injection nozzle 11 with a conical tip is formed, uniformly distributed injection holes 12 being provided over its circumference. In order to form the conical jet, at least six injection holes, preferably 10 to 12 injection holes 12, are distributed uniformly over the circumference of the injection nozzle 11. In order to improve the quality of the internal mixture formation by precisely guiding the individual jets of fuel, the injection holes are rounded by hydro-erosion. The injection holes 12 preferably have a diameter of less than 140 μm. At the same time, a ratio between the length of the injection holes L and the diameter D of L/D<3 is considered to be advantageous: the ratio preferably being approximately 2. The injector tip 19 of the injector 8 according to FIG. 2 is preferably formed with ratios D1/D2 of 0.4 to 0.7 and L1/L2 =0.08 to approximately 0.22.

In order to ensure reliable ignition and clean combustion during a jet-controlled combustion method and in particular in the stratified charge operating mode of the internal combustion engine, the internal formation of mixture and distribution of fuel can be supported by suitable movement of air in the combustion chamber. The inlet air can be controlled by a corresponding configuration of the inlet passage to provide a swirl around the cylinder axis 7 or by tumbling movements in a plane of the injector axis 7.

Figure 3:
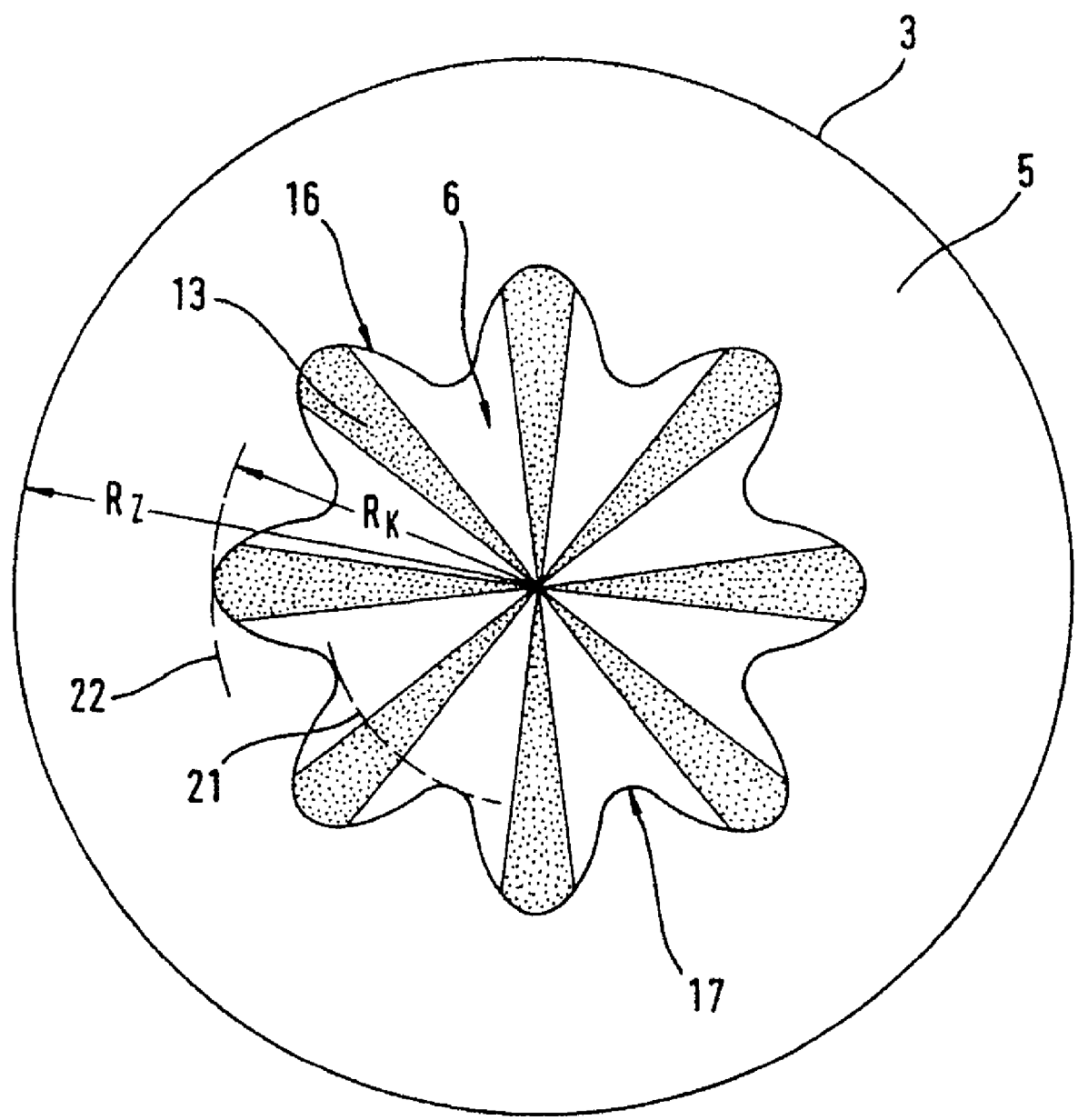
FIG. 3 is a top view of a piston head with a piston recess formed therein.

According to the invention, a piston recess 6, which is formed in a central position opposite the injection nozzle 11, is provided in the piston head 5 of the piston 3 which is illustrated in section in FIG. 1. In order to counteract wetting of the piston head 5 with fuel during very late injection in the stratified charge operating mode when the piston head is in fact already near the injector, the piston recess 6 is widened, as illustrated in FIG. 3, with radial cavities 16. The radial cavities 16 which are formed in the piston head 5 are distributed over the circumference of the piston recess 6 in such a way that each injection hole 12 of the injector 8 is assigned a cavity 16 for receiving the respective jet 13 of fuel. In the exemplary embodiment of the piston 3 which is represented in plan view in FIG. 3, eight cavities 16 are provided for an injector with eight injection holes, said cavities 16 being arranged in a rotationally symmetrical fashion over the circumference of the piston recess 6 in accordance with the uniform arrangement of the injection holes over the circumference of the fuel injection nozzle. The radial cavities 16 extend in a radial direction as far as a common circumscribed circle 22 whose radius $R_K$ is preferably 0.6 to 0.9 times, preferably 0.8 times, the radius $R_Z$ of the piston 3 or of the cylinder 2. The piston recess 6 which extends over the circumscribed circle 21 is widened in some sections in the region of the jets of fuel of the injector by the radial cavities 16, as a result of which a longer distance is made available for each jet 13 of fuel and wetting of the surface of the piston is counteracted even when the piston is in a position near the injector.

The radial cavities 16 are preferably formed in the piston 3 in such a way that, in the region of the cavities inside the piston 3, the piston recess 6 extends radially beyond an edge 17 formed at the level of the piston top 5. The radial depressions for receiving the respective jets of fuel are located inside the piston 3 underneath the top surface of the piston in the form of cavern. The piston recess 6 is advantageously configured with a depth of at least 5 mm and is raised in the center 15 thereof which gives the bottom of the piston recess 6 a conical shape and contributes to guiding the mixture cloud into the radial cavities 16 during the formation of the mixture.

The inventive radial cavities 16 of the piston recess 6 prevent, on the one hand, the wetting of the surface of the piston with fuel so that very late injections of fuel during a stratified charge operating mode are also possible and the quality of the mixture formation can thus be increased. Furthermore, the inventive radial cavities 16 in the radial direction of the propagation of the injector conical jet contributes to preserving the structurally required compression ratio of the respective internal combustion engine. The compression ratio advantageously varies between 10 and 13 in aspirating engines and between 8.5 and 11 in supercharged internal combustion engines.

Forming the surface of the piston with radial cavities in the piston recess permits a free selection of the angles of aperture of the conical jet of the injector 8 with respect to the combustion quality to be achieved. A jet angle between the individual jet axes of the jets of fuel measured on the injector axis of 60° to 130° is freely selectable, with an angle of aperture of the conical jet of 75° to 85° being considered advantageous.

The injector may be equipped with heating elements for preheating the fuel or else have devices for feeding different types of fuel (bi-fuel valve), for example for feeding volatile starting fuel for cold starting.

In terms of the overall adjustment of the internal combustion engine, in order to improve the formation of the mixture with a piston with radial cavities in the piston recess a ratio of the diameters of the injection valve to the cylinder bore of 0.3 to 0.38 and a ratio of the diameter of the outlet valve to the cylinder bore of 0.28 to 0.32 appears expedient. The diameter of the inlet valves and the outlet valves advantageously have a ratio of 1.02 to 1.1 to one another here. With a high injection pressure of advantageously more than 160 bar it is possible for precise and very late metering of fuel to take place since the radial cavities according to the invention also prevent wetting of the surface of the piston in the case of a high pressure. The cavities 16 which lie diametrically opposite one another in the piston recess 6 form here an omega shape which contributes to conditioning the jet of fuel injected into the respective radial cavity 6. A ratio of the channel length of the injection holes 12 illustrated in FIG. 2 to the injection pressure should be less than $0.25 \times 10^{-9}$ m/Pa. In order to improve the flammability of the cloud 14 of mixture in the stratified operation mode, the spark plug is expediently positioned between two jets of fuel 13 of the injector. If a cylinder head with four valves is used, the spark plugs should be located between the outlet valves. The spark plugs may be installed here with a ground electrode which depends on the angle of rotation, and in order to stabilize the ignition it is also possible to use a plurality of spark plugs and in particular an alternating voltage ignition system with variable spark duration.

The combustion chamber geometry according to the invention with radial cavities for widening the piston recess and receiving the individual jets 13 of fuel of a multi-hole injector 8 permits very late injection of fuel without wetting of the piston and allows rapid ignition of the fuel/air mixture at not more than 10° crank angle after the end of the fuel injection.

What is claimed is:

1. A direct-injection spark-ignition internal combustion engine having cylinders (2) with combustion chambers (4) and pistons (3) disposed in the cylinders (2) and one injector (8) per cylinder (2) for injecting fuel into the combustion chamber (4) which is bounded by the piston (3) movably disposed in the respective cylinder, the injector (8) having an injection nozzle (11) with a plurality of injection holes (12) distributed over its circumference for the generation of jets of fuels (13), the injection holes (12) forming during an injection process, with combustion air fed separately into the cylinder (2), a conical cloud (14) of fuel, said piston (3) having a piston head (5) and a recess (6) formed in the piston head (5), approximately opposite the injection nozzle (11), the piston recess (6) having a plurality of radial cavities (16) formed in the piston head (5) for receiving injected fuel, the radial cavities (16) being distributed over the circumference of the piston recess (6) in such a way that each injection hole (12) of the injector (8) is assigned a cavity (16) for receiving the respective jet of fuel (13).

2. The internal combustion engine as claimed in claim 1, wherein the cavities (16) are distributed rotationally symmetrically over the circumference of the piston recess (6).

3. The internal combustion engine as claimed in claim 1, wherein the piston recess (6) is arranged centrally in the piston head (5) and the injector (8) is arranged on the cylinder axis (7) of the cylinder (2).

4. The internal combustion engine as claimed in claim 1, wherein the piston recess (6) in the piston (3) is formed extending radially beyond an edge (17) of the piston top surface.

5. The internal combustion engine as claimed in claim 1, wherein the piston recess (6) is provided with a central elevation (15) at its bottom.

6. The internal combustion engine as claimed in claim 5, wherein the elevation (15) has a conical configuration.

7. The internal combustion engine as claimed in claim 1, wherein the injector (8) is a perforated seat nozzle with an inwardly opening valve element (18).

8. The internal combustion engine as claimed in claim 1, wherein the radial cavities (16) of the piston recess (6) lie within a circumscribed circle with a radius ($R_K$) which is 0.6 to 0.9 times, the radius ($R_Z$) of the piston (3).

9. The internal combustion engine as claimed in claim 8, wherein the radius $R_k$ is approximately 0.8 times the radius $R_2$ of the piston (3).

10. The internal combustion engine as claimed in claim 1, wherein an angle ($\alpha$) of aperture of a cone which is formed by the jets of fuel (13) of all the injection holes (12) is 60° to 130°.

11. The internal combustion engine as claimed in claim 10, wherein the cone formed by the jets has an angle $\alpha$ of 75° to 85°.

12. A method for operating a direct-injection spark-ignition internal combustion engine having cylinders (2) with combustion chambers (4) and pistons (3) disposed in the cylinders (2) and one injector (8) per cylinder (2) for injecting fuel into the combustion chamber (4) which is bounded by the piston (3) movably disposed in the respective cylinder, the injector (8) having an injection nozzle (11) with a plurality of injection holes (12) distributed over its circumference for the generation of jets of fuels (13), the injection holes (12) forming during an injection process, with combustion air fed separately into the cylinder (2), a conical cloud (14) of fuel, said piston (3) having a piston head (5) and a recess (6) formed in the piston head (5), approximately opposite the injection nozzle (11), the piston recess (6) having a plurality of radial cavities (16) formed in the piston head (5) for receiving injected fuel, the radial cavities (16) being distributed over the circumference of the piston recess (6) in such a way that each injection hole (12) of the injector (8) is assigned a cavity (16) for receiving the respective jet of fuel (13), said method comprising the step of starting the injection of the fuel at a later time during the compression stroke of the cylinder (2) than approximately 50° CA (crank angle) before the top dead center thereby forming a stratified mixture with locally different fuel concentrations at least in lower load ranges of the internal combustion engine (1).

13. The method as claimed in claim 12, wherein the fuel/air mixture is ignited at the latest 10° CA after the end of the fuel injection.

14. The method as claimed in claim 10, wherein the fuel is injected with a pressure of more than 80 bar and less than 160 bar.

* * * * *